Patented Jan. 21, 1941

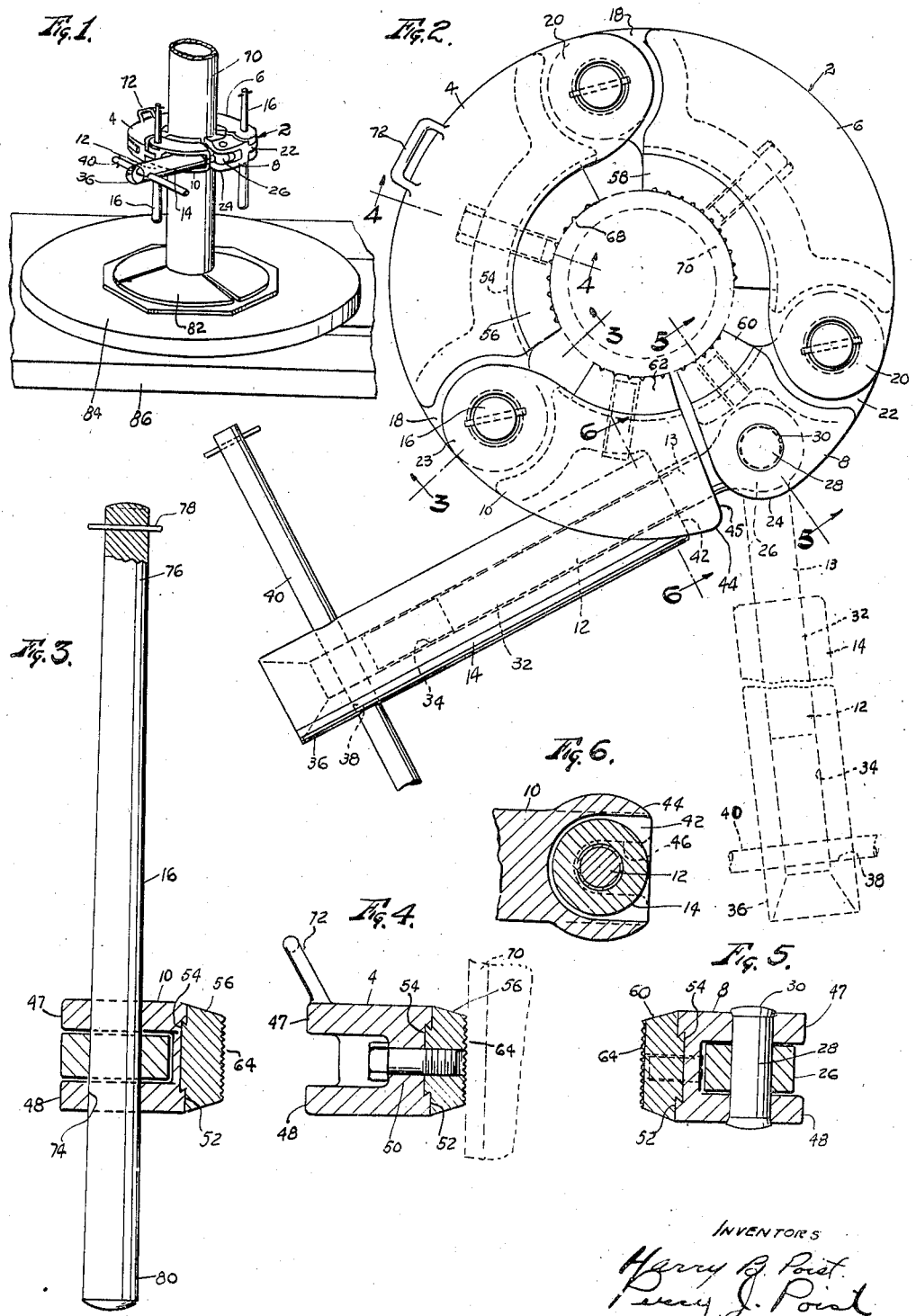

2,229,607

UNITED STATES PATENT OFFICE 2,229,607

SELF-ADJUSTABLE CLAMPING SPIDER AND THE LIKE

Harry B. Poist and Percy J. Poist, Long Beach, Calif.; said Percy J. Poist assignor to said Harry B. Poist Application December 13, 1939, Serial No. 308,912

3 Claims. (Cl. 24—263)

Our invention relates to a self-adjustable clamping spider and more particularly to such devices which are especially used and adapted for clamping and for holding in a position the drilling tools, such as the drill pipe, external flush pipe, the stream-line pipe, the drill collars or any other drilling tool or casing, also for holding same and for preventing its slipping out of place, particularly when dismantling or assembling the pipe lengths used for drilling or re-conditioning the oil well, thereby preventing the loss of a drill pipe or the drilling equipment within the well and preventing possible damage thereto.

Primarily, the clamping spider may be used as a safety device in conjunction with the gripping slips of the rotary drilling table, when assembling the lengths of the drill pipe, or such tools as may be adapted for drilling, re-conditioning or making a well ready for production, also, said clamping spider may be used and employed as an operating tool when assembling or dismantling the short pipe lengths and when the weight of said drilling tools is not too great.

As a safety measure, the clamping spider is placed and fastened around the pipe, having the self-adjustable pins of the spider joints extending downwardly in their lowermost positions and protruding therethrough, so that their contact with the rotary table gripping slips or any other object, would cause said pins to be urged into upward position thereby tightening the grip of the spider jaws around said pipe when the drill pipe slips into the well hole, due to its weight coupled with the faulty condition or worn out jaws of the gripping slips positioned at the mouth of the rotary table used for drilling wells.

Manifestly, an object of our invention is to provide a suitable clamping spider means, comprising a plurality of sub-joined collar sections, which encompasses the drilling tools such as the drill pipe, the external flush pipe, the stream-line pipe or the like, the external surfaces of which are smooth and therefore very difficult to hold same in place by means of the conventional gripping slips of the rotary table used in drilling wells, said clamping spider means having its joints provided with a specially arranged wedging means consisting of sockets which are provided with pins and which are slidably mounted and so positioned therein, whereby a firm and a positive grip upon said drilling tools may be had and thereby the slipping of said tools may be prevented.

A further object of our invention is to provide said spider means with suitable hinged joints, which, in their unlocked position may quickly and efficiently be placed around said pipe or the drilling tool and be clamped in any position above the gripping slips of said rotary table.

Another object of our invention is to provide said spider joints with removable jaw means, which may be quickly replaced and exchanged to suit any particular condition or shape as may arise when assembling the drill pipe lengths.

Further object of our invention is to provide said spider joints with suitable tapered holes or sockets, having suitable tapered pins or rod means positioned therein, which under ordinary conditions will hold said drilling pipe in a position, and when said drilling pipe does slip into the well, passing by the gripping slips of the rotary table, said tapered pin means when in contact or when striking against said gripping slips will cause said joints of said spider to tighten and adjust the jaw means into position, which will grip said pipe and will also cause the pipe weight to force said gripping slips of said rotary table into place and thereby preventing further slipping of said drill pipe.

Other and further objects and advantages of our invention as will hereinafter more fully appear, we attain by the construction herein shown on the drawing and described in the specification, forming a part of our application.

Reference is had to the accompanying drawing, in which the similar reference characters denote the similar parts.

In the drawing;

Fig. 1 is a perspective and a fragmentary view of our invention applied to a drill pipe held by means of gripping slips of the rotary table, showing the invention positioned around the drill pipe and approximately in suitable position above said pipe gripping slips.

Fig. 2 is an enlarged top view of the spider showing it in a pipe gripping position.

Fig. 3 is a vertical and partly sectional view of the spider joints and the tapered pin taken in the direction of the line 3—3 of the Fig. 2.

Fig. 4 is another vertical cross sectional view of the spider body, showing the removable pipe gripping jaws in position and taken on the line 4—4 of the Fig. 2.

Fig 5 is another vertical cross sectional view of the hinge pin, taken on the line 5—5 of the Fig. 2.

Fig. 6 is a vertical cross sectional view of the locking bar, taken on the line 6—6 of the Fig. 2.

Describing our invention more in detail, said invention comprises a spider generally designated by numeral 2 which consists of sub-joined clamping units 4, 6, 8 and 10 which are hingedly connected and having a suitable locking screw 12 provided with a shank 13 and a locking bar 14 for locking said spider 2 in place.

Said clamping units 4 and 6 are practically identical in their shape and construction, having a tapered hinge pin 16 slidably disposed at their section ends, each comprising a male joint 18 and an interlocking female joint 20, while the unit 8 at its end section is provided with a male joint 22 and the unit 10 is provided similarly with a female joint 23.

The end section of the female joint 20 of said unit interlocking with the male joint 22 of said unit 8 is also provided with a recess 24 which is adapted to receive therein the eyelet member 26 of the locking screw 12 and which is held therein in pivotal position by means of a hinge pin member 28 having the outer ends thereof riveted over as at 30, see Fig. 5, and thus allowing the end 32 of said locking screw 12 to swing outwardly, as shown in dotted lines, see Fig. 2.

The end 32 of said locking screw 12 is threaded and is adapted to receive a correspondingly threaded socket 34 of the bar member 14, the length of which may be of any desired dimension as in practice may be most desirable, while its extended end 36 is provided with a transversely positioned hole 38 wherein a suitable cross rod 40 is inserted for handling it when screwing and abutting the bar end 42 against the yoke section 44, which between the end section 45 said yoke section 44 provides sufficient thickness to withstand the pressure of the bar member 14, having a suitable slot member 46 provided therein for receiving said shank member 13 of said locking screw 12.

For the purpose of lightness and the strength, each of said units 4, 6, 8 and 10 is provided with a pair of outwardly extending ribs 47 and 48, preferably lying in parallel to each other and having a center body section 50 at right angle thereto for forming an internal collar section 52 which is provided with a suitable dove-tail member 54 adapted to receive therein the gripping jaws 56, 58, 60 and 62 each of which is provided with a plurality of horizontally disposed angular teeth members 64 and having in addition a plurality of vertical V-grooves 68 thus forming substantially the short edged gripping teeth which hold the drilling pipe 70 in position.

In order to hold said spider 2 in a position when clamping same around the pipe 70, a suitable handle member 72 is positioned at the outer edge of one of said units, preferably the unit 4, which may, if so desired, be used for tying a rope to it, or be handled by hand while in a clamping operation.

The male and the female joints 18 and 20 respectively, including the male joint 22 of the unit 8 and also the female joint 23 of the unit 10 are interlocked in position, all joints having tapered holes or sockets 74 which are lined up vertically and are adapted for receiving therein the tapered hinge pin 16, of which the upper end 76 is smaller in proportion and provided with a cross pin member 78 for preventing its slipping through or become disengaged when in its lowermost position, while the bottom end 80 is much larger in size to provide sufficient body for abutting against the surface of the gripping slips 82 disposed in the revolving table 84 of the rotary drilling unit 86.

As shown in Figs. 1 and 2 said spider is clamped around the drilling pipe 70, having its hinge pins 16 extended downwardly toward the gripping slips 82 when in their lowermost position and due to the tapered shape of said holes 74, said pins 16 will extend downwardly resting upon said cross pins 78 while the jaws 56, 58, 60 and 62 will grip tightly around said pipe 70 when the shank 13 of said locking screw 12 is inserted within said slot member 46 of said yoke section 44 and said spider units 4, 6, 8 and 10 are tightened in place by means of the bar end 42 of the locking bar 12.

In the event said pipe 70 should slip downwardly between the jaws of the gripping slips 82, because of its excessive weight or worn out jaws, or improper placing of said gripping slips 82 within the proper place provided therefor, or in event of failure of said gripping slips 82, then said spider 2 together with its pins 16 extending downwardly in their lowermost positions will slip together with said pipe 70 only a short distance, thus causing the pin ends 80 to strike and abut against the gripping slips 82, which will cause said pins 16 to be urged upwardly into upward position and sliding in their tapered holes 74, thereby tightening said clamping units 4, 6, 8 and 10, also at the same time causing said gripping slips 82 in said rotary table 84 to grip said pipe 70 more firmly and thereby preventing said pipe 70 from slipping into said well and loosing it, also preventing a very expensive fishing operation of the pipe or tools from said well which otherwise would be unavoidable.

While we have thus described our invention with great particularity, it will be clear that the same may be modified throughout a wide range.

We accordingly do not propose to be limited to the exact details of construction herein shown on the drawing and described in the specification, but reserve the right in practice to make the necessary changes and modifications therein which may come within the scope of the appended claims.

We claim:

1. In a safety tool of the class described adapted for gripping and for holding the well drilling pipe in place and for maintaining same disposed above the gripping slips of the rotary drilling table, a plurality of interlocking and sub-joined clamping spider sections hingedly and adjustably connected with each other for encompassing said drilling pipe, a locking bar means connected to at least two end sections of said clamping spider sections for gripping, fastening and for locking said clamping spider sections around said drilling pipe, a tapered socket means disposed at each end of the remaining ends of said interlocking and sub-joined clamping spider sections, a long tapered hinge pin means slidably disposed in each of said tapered socket means having their bottom ends disposed at their lowermost position for hingedly holding same and for maintaining said ends including said clamping spider sections in place, also for tightening and for enforcing their hold around said drilling pipe when striking and resting against said gripping slips of said rotary drilling table, including for tightening the grip of the rotary table gripping slips around said drilling pipe, thereby preventing said drilling pipe from slipping into the well, substantially as described.

2. In a clamping device of the class described adapted for gripping and for holding a drilling pipe firmly in place and above the drill pipe gripping slips of the rotary drilling table, a plurality of sub-joined clamping means hingedly connected with each other at their end sections for encompassing said drilling pipe, a removable and inter-changeable gripping jaw means connected by dove-tail joint to each of said sub-joined clamping means for gripping said drilling pipe and for holding same in place, locking means connected to at least two end sections of said sub-joined clamping means for locking same in place and around said drilling pipe, an adjustable tightening hinge pin means connected to and associated with each hinged joint of said sub-joined clamping means for tightening and enforcing the grip of said gripping jaw means around said drilling pipe when urged upwardly and thereby preventing the slipping of said drilling pipe past said gripping slips of said rotary drilling table.

3. In a clamping spider of the class described adapted for gripping and for holding a drilling pipe firmly in place and above the gripping slips of the rotary drilling table, comprising a plurality of clamping unit means having their end sections hingedly sub-joined together for encompassing said drilling pipe, a plurality of interchangeable gripping jaw means connected by dove-tail joint to each of said clamping unit means and disposed adjacently to the outer surface of said drilling pipe, each having gripping teeth disposed at their inner surface for gripping said drilling pipe and for holding same in place, a hinged locking means connected to at least two end sections of said clamping means for locking same in place and around said drilling pipe, an adjustable tightening hinge pin means connecting each hingedly sub-joined end section of said clamping unit means projecting downwardly and operating upon engagement with the horizontal surface of said gripping slips of said rotary drilling table for tightening and enforcing the grip of said gripping jaw means around said drilling pipe when urged upwardly and thereby preventing the slipping of said drilling pipe past said gripping slips of said rotary drilling table, substantially as described.

HARRY B. POIST.
PERCY J. POIST.